Sept. 13, 1938.                G. W. McKEE                2,129,856
                            PRESSURE REGULATOR
                            Filed June 22, 1936
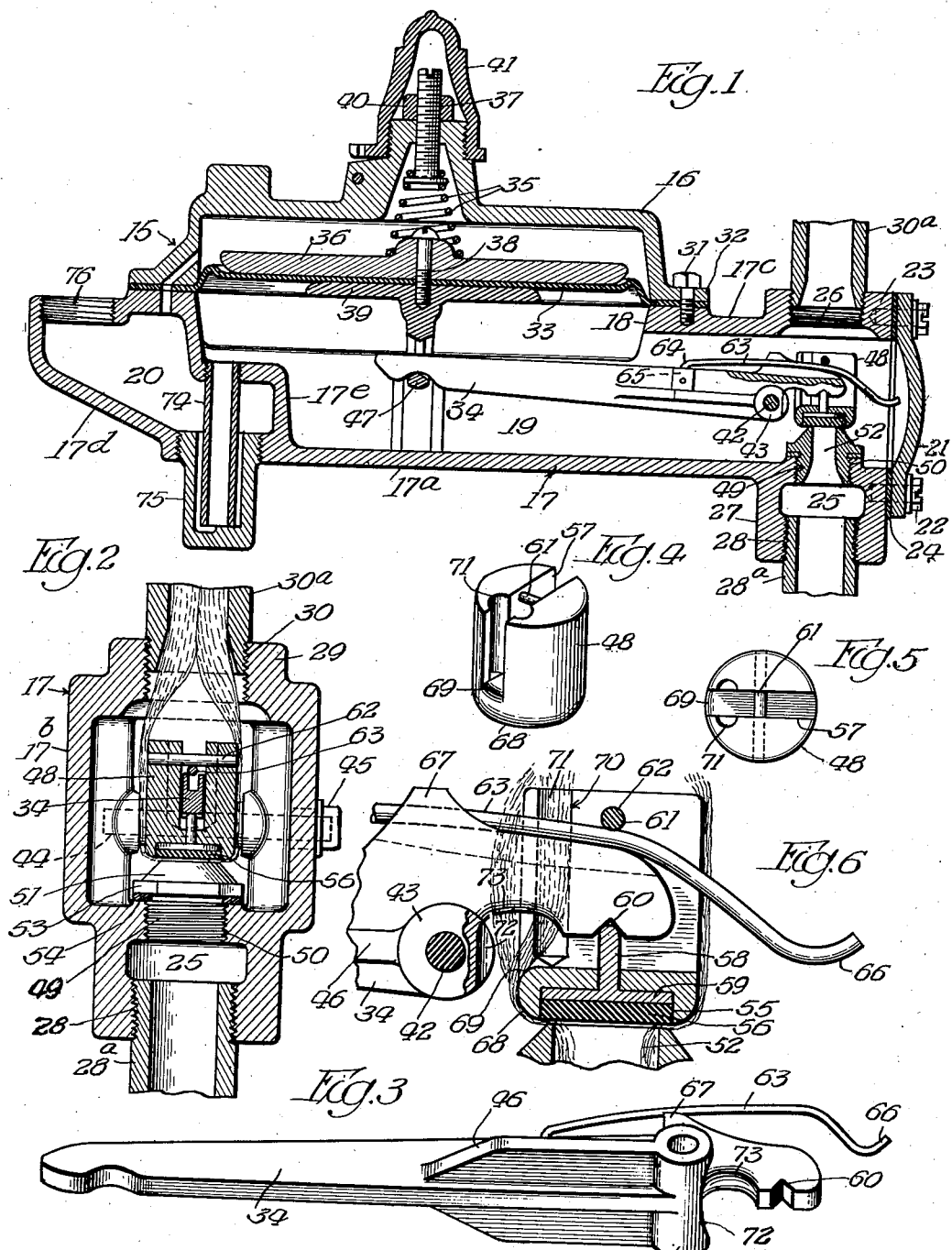

Patented Sept. 13, 1938

2,129,856

UNITED STATES PATENT OFFICE 2,129,856

PRESSURE REGULATOR

Garnet W. McKee, Rockford, Ill.

Application June 22, 1936, Serial No. 86,483

7 Claims. (Cl. 50—26)

The present invention relates generally to pressure regulators. More particularly the invention relates to that type of regulator which is designed for use in a system for supplying gas to household or industrial gas burning appliances, serves to maintain substantial uniformity of pressure of the gas in the usual piping between it and the appliances regardless of the rate of flow of the gas, and embodies as the main parts thereof (1) an elongated, horizontally extending casing which comprises a lower part having a gas chamber therein and embodying at one of its ends an inlet for the gas and a gas outlet above and in registry with the inlet, and also comprises an upper part over the gas chamber; (2) a diaphragm which is clamped between the upper and lower parts of the casing and is responsive to fluctuations in the pressure of the gas in the chamber; (3) a valve which serves to control the flow of gas into the casing in response to fluctuation or operation of the diaphragm and is disposed between the inlet and the outlet and so that the gas strikes against the bottom face thereof; (4) a valve actuating lever which is fulcrumed centrally in the casing and has one end thereof operatively connected to the valve and its other end connected to the diaphragm so that it operates to open the valve when the diaphragm fluctuates in one direction as the result of a decrease in pressure within the casing; and (5) means whereby when the valve is open, the gas after striking against the bottom face of the valve, is caused to flow upwards in a thin tubular stream around the outer face of the valve and then to pass directly into the outlet.

In a pressure regulator of this type the purpose of providing means for causing the gas after striking against the bottom face of the valve to flow upwards in a thin tubular stream around the outer face of the valve and then to pass upwards directly into the outlet is to create in the inner end of the outlet a jet action which increases in magnitude as the rate of flow of the gas into the outlet increases and tends because of the resulting diminution or decrease of the pressure of the gas under the diaphragm to control the regulator so that the outlet pressure of the gas is either uniform or constant at all times or increases slightly as the rate of flow to the inlet increases. In practice it has been found that in the operation of a pressure regulator of the type under consideration a portion of the thin tubular stream of gas flowing upwards around the valve and towards the outlet strikes or impinges against the under side of the valve carrying end of the lever and as a result of flowing laterally under the diaphragm and causing an increase in pressure under the latter operates either to counteract the effect of the jet action and thus to cause a decrease in the pressure of the gas in the outlet as the rate of flow of the gas through the casing increases or to cause the regulator to "hunt" or "surge."

The primary object of the invention is to provide a pressure regulator of the type under consideration which will not "hunt" or "surge" and is more efficient and stable in operation than previously designed regulators by reason of the fact that it includes simple means whereby during operation of the regulator the portion of the annular stream of gas that is directed towards the under side of the valve carrying end of the lever is guided so that instead of impinging against the lever and flowing laterally under the diaphragm, it passes upwards with the stream directly into the outlet.

Another object of the invention is to provide a pressure regulator of the last mentioned design or character in which the upper portion of the valve embodies a vertically extending duct and the means for controlling or guiding the portion of the tubular stream of gas that is directed toward the bottom or under face of the valve carrying end of the lever is in the form of a rounded surface which entrains the aforementioned portion of the stream and directs it into the duct for vertical passage to the gas outlet of the casing.

A further object of the invention is to provide a pressure regulator which is extremely efficient in operation, may be manufactured at a low and reasonable cost, and is an improvement upon that which forms the subject matter of Letters Patent of the United States No. 2,026,793, granted to me January 7, 1936.

Other objects of the invention and the various advantages and characteristics of the present pressure regulator will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a vertical longitudinal section of a pressure regulator embodying the invention;

Figure 2 is an enlarged vertical transverse section on the line 2—2 of Figure 1;

Figure 3 is a perspective of the lever which controls or actuates the valve in response to fluctuations of the diaphragm due to changes of pressure within the casing;

Figure 4 is a perspective of the valve;

Figure 5 is a plan view of the valve; and

Figure 6 is a vertical section of the valve showing the vertically extending duct and illustrating the character and design of the round or curved surface for entraining that portion of the tubular stream which is directed toward the bottom portion of the valve carrying end of the lever and directing it into the duct for vertical passage to the gas outlet.

The regulator which is shown in the drawing constitutes the preferred embodiment of the invention and is adapted for use in a system for supplying gas from a gas main (not shown) to different household or industrial gas burning appliances (also not shown). It comprises an elongated, horizontally extending cast metal casing 15 and operates to reduce or cut down the pressure of the gas as it flows from the gas main and to maintain substantial uniformity of pressure of the gas flowing to the different appliances regardless of the rate of flow of the gas. The casing 15 embodies an upper part 16 and a lower part 17. The lower part of the casing comprises a bottom wall 17a, a pair of side walls 17b, a top wall 17c, a cross wall 17d and an end wall 17e. The top wall 17c is provided in the central portion thereof with a circular opening 18. The cross wall is located adjacent to the end wall 17e and with the other walls of the lower part of the casing defines a gas chamber 19 at one side thereof and a relief chamber 20 at its other side. The end of the lower part 17 of the casing that is opposite to the end wall 17e is closed by means of a plate 21 which is removably secured in place by means of bolts 22. The latter, as shown in Figure 1, extend through the margin of the plate and fit within internally threaded holes in a flange 23. A gasket 24 is interposed between the flange and the margin of the plate for sealing purposes. The end of the lower part of the casing which has the plate 21 embodies an inlet 25 for gas and a gas outlet 26. The inlet 25 is in the form of a tubular part 27 which is formed integrally with and depends from the bottom wall 17a and embodies an internal screw thread 28 for connection to a gas delivery pipe 28a. The latter is in the nature of a branch from the gas main and serves to supply gas via the inlet 25 into the regulator casing 15. The outlet 26 is in the form of a tubular part 29 which is formed integrally with and projects upwardly from the top wall 17c of the lower part of the casing. The part 29 is located directly above the inlet forming part 27 and embodies an internal screw thread 30 for connection to a service pipe 30a. The latter includes the usual meter (not shown) and serves to conduct gas from the casing of the regulator to the different gas burning appliances which are supplied with gas by the system in which the regulator is employed. The upper part 16 of the casing is located above the opening 18 in the top wall 17c and is connected removably to the lower part of the casing by means of bolts 31. The latter extend through an outwardly extending flange 32 on the upper part of the casing and fit within integrally threaded holes or sockets in the portion of the top wall 17c of the lower part of the casing that defines the circular opening 18.

In addition to the casing 15, the regulator comprises a circular diaphragm 33 and a substantially horizontal lever 34. The diaphragm extends across the circular opening 18 and has the marginal part thereof clamped between the flange 32 and the subjacent portion of the top wall 17c of the lower part of the casing. The lower face of the diaphragm is exposed to the gas that passes into the chamber 19 through the inlet 25 and hence the diaphragm responds to variations in the pressure of the gas in the chamber. The upper face of the diaphragm is subjected to the action of a spring 35 which extends between a cast metal plate 36 and a hollow adjusting screw 37. The plate 36 fits against the upper face of the diaphragm and is held in place by a screw 38. This screw extends through the center of the diaphragm and is anchored to a plate 39 which fits against the lower face of the diaphargm. The adjusting screw 37 extends through the central portion of the upper part 16 of the casing and is held in place by a lock nut 40. By adjusting the position of the screw 37 the tension of the spring 35 may be varied for regulator setting purposes. A cap 41 is removably secured by a screw thread to the central portion of the upper part 16 of the casing and serves as a closure for and to protect the lock nut 40 and the upper end of the adjusting screw. The lever 34 is disposed in the gas chamber 19 in the lower part of the casing 15 and extends between the gas inlet 25 and the central portion of the plate 39 on the under or bottom side of the diaphragm 33. It is in the form of a die casting and is of materially less thickness than height, as shown in Figures 2 and 3 of the drawing. A pin 42 serves as a fulcrum for the lever. This pin extends through a horizontally extending cylindrical bearing member 43 on the central portion of the lever and the ends thereof fit within oppositely facing sockets 44 in the side walls 17b of the lower part of the casing. One of the sockets 44 is open at its outer end so that the pin may be removed from the casing during installation or removal of the lever with respect to the casing. A cap-type plug 45 fits in the socket with the open outer end and serves when screwed into place to hold the pin against axial displacement. The cylindrical bearing member 43 is formed as an integral part of the lever 34. It projects outwardly from the sides of the lever and is located a small distance inwardly from the end of the lever that is adjacent to the gas inlet 25. A pair of horizontally extending ribs 46 project outwardly from the sides of, and serve to reinforce, the lever as well as to guide the latter into position when it is inserted into the casing for assembly purposes. The end of the lever that is disposed adjacent to the plate 39 is operatively connected to the diaphragm 33 by means of a stirrup 47. The latter is connected to, and extends downwardly from, the central part of the plate 39 and operates to swing the lever vertically in response to movement of the diaphragm. The end of the lever that is remotely positioned with respect to the plate 39 and carries the cylindrical bearing member 43, supports a valve 48. This valve coacts with a valve seat 49 and is adapted in response to swinging of the lever 34 by the diaphragm to control the flow of gas through the casing to the outlet 26. When the pressure of the gas in the chamber 19 increases beyond a certain point the diaphragm 33 is forced upwardly. This upward movement of the diaphragm is in turn imparted to the lever 34 and serves to shift the valve into its closed position in order to cut off or reduce the inflow of gas and thus maintain uniformity of pressure as far as the gas passing through the outlet 26 is concerned. When the pressure in the gas chamber 19 decreases, the diaphragm 33 moves downwardly and causes the lever 34 to swing so as to shift the valve 48 into its open position. Opening of the valve results in a greater flow of gas to the casing outlet 26 and stabilization or uniformity of pressure. The valve seat 49 is located directly above the gas inlet 25 and is secured to the bottom wall 17a of the lower part of the casing by a screw thread connection 50. It is provided with a tapered upper part 51 and embodies a central passage 52 through which the gas passes from the inlet 25 to the gas chamber 19. A polygonal flange 53 is formed on the central portion of the valve seat so that the seat may be turned by a wrench or similar turning tool into connected relation with the bottom wall of the casing part 17. A gasket 54 serves to prevent leakage of gas around the valve seat. This gasket is mounted on the central portion of the valve seat and is clamped between the polygonal flange 53 and the subjacent portion of the bottom wall 17a of the lower part of the casing. When it is desired to obtain access to the valve seat the plate 21 is removed by withdrawing the bolts 22 from the flange 23.

The valve 48 is in the form of a vertically extending cylinder. It extends between the gas inlet 25 and the outlet 26 and is formed of brass or any other suitable metal. A circular pocket 55 is formed in the bottom face of the valve and a disk 56 of hard leather or any other suitable sealing material is disposed in this pocket in such manner that the bottom face thereof is flush with the bottom face of the valve. The disk 56 is held in place in the pocket in any suitable manner and is adapted to fit against the tapered part 51 of the valve seat 49 in order to close the central passage 52 and cut off the flow of gas from the inlet 25 to the gas chamber 19. The end of the lever 34 that supports the valve 48 extends into a diametric slot 57 in the valve. This slot, as shown in the drawing, extends through the top and central portions of the valve and is slightly wider than the lever so as to permit the valve to move or tilt sidewise to a limited extent for valve seating purposes. A vertically extending stud 58 is disposed in the bottom portion of the slot 57. The lower end of this stud projects into the circular pocket 54 and embodies a circular head 59. The latter serves as an anchor for the stud and is held in the upper portion of the pocket by means of the disk 55 of sealing material. The upper end of the stud is hemispherical and fits in a notch 60 in the bottom face of the portion of the lever 34 which is disposed in the slot 57. This notch together with the stud forms a joint or a connection between the valve and the lever whereby the valve is permitted to move universally to a limited extent relatively to the lever. The stud 50 is of such length that the contiguous portion of the lever is positioned sufficiently far from the bottom of the slot 57 so that the valve may tilt lengthwise of the lever to the proper extent to seat the disk 55 against the tapered part 52 of the valve seat when the lever is swung by the diaphragm into a valve closing position. The valve 48 is supported from the lever by means of a pin 61. The latter extends across the top portion of the slot 57 and is mounted in oppositely facing holes 62 in the upper portion of the valve. The central portion of the pin, that is, the portion in the slot 57 overlies the portion of the lever above the stud 58 and rests on the central portion of a strip 63 of spring wire. The spring wire strip extends longitudinally of the lever and is bent downwardly at one end so as to form an anchor piece 64. The latter extends downwardly into a hole 65 in the central portion of the lever 34 and is fixedly secured in place. The central portion of the spring wire strip 63 bears against the pin 61 and is under such spring tension as the result of the bend which forms the anchor piece 64 that it urges the valve 48 upwardly and holds the stud 58 in the notch 60. The free end of the spring wire strip 63 extends downwardly and is provided with an upturned hook part 66. This hook part is adapted to facilitate mounting of the valve on the lever when the lever is in the gas chamber 19. The spring wire strip 63 is held against transverse displacement with respect to the lever by means of a pair of laterally spaced webs 67. These webs extend upwardly from and are formed as an integral part of the top face of the lever. They lap the sides of the spring wire strip and are positioned directly above the cylindrical bearing member 43 for the pin 42. During tilting of the valve 48 with respect to the lever in connection with closing of the disk 55 against the tapered part of the valve seat 49 the pin 61 rides on top of the central portion of the spring wire strip 63. The outer or free end of the spring wire strip 63 is preferably of such length that the hook part 66 is readily accessible when the plate 21 is removed from the casing. As shown in the drawing the central portion of the plate 21 is bulged slightly outwardly and the hook part is located in the concavity on the inner face of the plate. By arranging the hook part in this manner it may be readily manipulated during mounting or removal of the valve with respect to the lever. The valve 48, as shown in the drawing is coaxially disposed or positioned with respect to the gas outlet 26 and embodies a rounded or smoothly curved surface 68 between its bottom and side face. This surface is substantially a quadrantal one and operates to cause the gas after striking or impinging against the disk 56, that is the bottom face of the valve, to flow upwards in a thin tubular stream along the side face of the valve and then to flow directly into the outlet 26. The diameter of the valve, as shown in the drawing, is slightly less than the diameter of the gas outlet 26 and consequently the gas as it enters the outlet produces a jet action, (see McKee Patent No. 2,026,793 for a more complete description). This jet action increases in magnitude as the velocity or rate of flow of the gas through the casing increases and due to the resulting diminution of the pressure of the gas under the diaphragm controls the regulator so that the pressure of the gas at the outlet is either constant or uniform regardless of the rate of flow, or increases slightly as the rate of flow of the gas increases.

In order to prevent the tubular stream of gas which is directed toward the under side of the valve carrying end of the lever from impinging or striking against said under side of the lever and flowing laterally under the diaphragm and thus operating either to counteract the effect of the jet action and thus to cause a decrease in the pressure of the gas in the outlet as the rate of gas through the regulator increases, or to cause the regulator to "hunt" or "surge" the valve is provided with a rounded surface 69 and a vertically extending duct 70. The surface 69 is curved quadrantally and is located directly beneath the under side or face of the valve carrying end of the lever. It leads from the side face of the valve to the inner end of the slot 57, that is the end of the slot which underlies the lever and is positioned adjacent to or directly opposite the cylindrical bearing member 43 on the lever 34. During flow of gas through the regulator the gas after striking against the bottom face of the valve is caused by the smoothly curved surface to flow upwards in a thin tubular stream toward the outlet 26, as previously described, and that portion of the stream which is directed towards the underside or face of the valve carrying end of the lever 34 instead of encountering a sharp edge at the point where the side wall of the valve encounters the inner end of the slot 57, and as a result flowing upwards and striking or impinging against the under face of the lever, encounters the rounded surface 69 and due to the entraining action of the surface is caused to flow into the portion of the slot 57 beneath the valve carrying end of the lever and thence into the lower end of the duct 70. The duct, as shown in the drawing (see Figure 6) is in the form of a pair of complemental, oppositely facing, semi-circular grooves 71 which extend from the bottom of the slot 57 to the top face of the valve and are formed in the faces of the valve which define the sides of the slot 57. The gas which is directed into the lower end of the groove formed duct 70 by the entraining action of the curved surface 69 flows upwards through the duct and passes directly into the gas outlet 26 with the remainder of the gas flowing upwards in a thin tubular stream around the side face of the valve 48. Upflow of the gas in the groove formed duct 70 into the outlet 26 occurs as the result of the suction or aspirating effect which is created by the flow of gas around the side face of the valve and upwards into the outlet. By employing the curved surface 69 and vertically extending duct 70 no gas in the thin tubular stream around the valve can impinge or strike against the under side of the lever 34 and flow laterally under the diaphragm where it would tend to build up pressure and either counteract the effect of the jet action in the inner end of the outlet or result in a "hunting" or "surging" action, that is, continual fluctuation in the pressure of the gas in the service pipe 30a. The portion of the cylindrical bearing member 43 that is nearest the valve 48 embodies a cut-out 72 so that it is spaced a sufficient distance from the valve that during maximum flow of the gas around the valve there is no likelihood of the outer portion of the stream coming in contact with the peripheral surface of the bearing member and being entrained by such surface so that it is directed onto the top faces of the ribs 46 and then flows, and builds up pressure, under the diaphragm 33. In order to prevent the under side of the valve carrying end of the lever from interfering with, or retarding the flow of, the gas which is entrained by the curved surface 69 and directed into the lower end of the groove formed duct 70 the under portion of the lever that is directly opposite to the cylindrical bearing member 43 is notched or cut away as at 73. The sides of the lever are beveled or curved adjacent to the notched or cut-out portion in order that any gas which strikes against said portion is deflected upwards and flows past the sides of the valve carrying end of the lever and hence with the tubular stream of gas into the outlet 26.

Assuming that the valve 48 is open the operation of the regulator is as follows: Gas enters the casing 17 by way of the central passage 52 in the valve seat 49 and strikes against the bottom face of the disk 56, that is, the bottom of the valve 48. From the disk the gas flows outwardly until it encounters the smoothly curved surface 68 which as hereinbefore described operates to cause the gas to flow upwardly around it and to travel in a thin tubular stream into the gas outlet 26. When the appliances which are supplied with gas by the service pipe 30a are operated at a higher capacity and as a result the flow of gas through the service pipe increases the diaphragm 33 in the regulator casing operates because of the resultant decrease in the pressure of the gas in the chamber to open the valve 48 so as to permit of an increase in flow of the gas from the branch pipe 28a to the service pipe. This increase in flow or volume of the gas increases the pressure in the service pipe 30a. When the appliances receiving gas from the service pipe are cut down so as to decrease the consumption of gas pressure builds up in the chamber 19 and causes the diaphragm 33 through the medium of the lever 34 to shift the valve so as to decrease the distance between the valve and the valve seat and thus reduce the inflow of gas through the casing and stabilize the outlet pressure. Because of the fact that gas flows into the outlet 26 in a more or less tubular stream, as shown in Figure 2, and causes a jet action in the regulator casing the regulator either operates to produce a substantially constant outlet pressure regardless of the rate of flow or controls the gas so that the outlet pressure thereof tends to increase slightly as the rate of flow increases. During upflow of the gas around the valve the portion of the stream which is directed towards the under side of the valve carrying end of the lever encounters the curved surface 69 and as a result of the entraining action of the latter flows into the lower end of the vertically extending duct 71 and then, as previously pointed out, passes upwards together with the remainder of the tubular stream into the outlet 26.

In order to permit of the escape of gas in the event that excess pressure is developed in the chamber 19 as the result of foreign particles preventing closing of the valve 48, a relief tube 74 is provided. This tube extends through the cross wall 17d of the lower casing part 17 and is arranged so that one end thereof projects downwardly into a cup 75 which is partially filled with mercury and communicates with the relief chamber 20. When excessive pressure develops in the gas chamber 19 the gas displaces the mercury in the cup and escapes via the relief chamber 20 to a vent opening 76.

The herein described pressure regulator is extremely efficient in operation and may be manufactured at a low and reasonable cost due to the design and construction of the valve. The valve is characterized by the fact that it operates not only to direct the gas upwards in a thin tubular stream into the outlet for jet forming purposes but also to entrain the portion of the stream that is directed towards the under side of the lever and guide such entrained portion of the stream upwards into the outlet with the rest of the gas.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In a pressure regulator comprising a casing having in one portion thereof a diaphragm adapted to fluctuate in response to changes in pressure within the casing, and having in another portion thereof an inlet for gas under pressure and a gas outlet directly opposite to the inlet, the combination of means forming a valve seat around the inner end of the inlet, a valve for controlling the flow of gas into the casing, disposed between the inlet and outlet and in spaced relation with respect to the interior surfaces of the casing and having a seat engaging face disposed directly opposite to the valve seat and adapted to have the gas strike thereagainst and also having a substantially continuous side face centrally positioned with respect to, and of less width than, the gas outlet, a lever for moving the valve in response to fluctuation of the diaphragm to and from the valve seat in order to regulate or control the pressure of the gas flowing out of the casing via the outlet, centrally fulcrumed in the casing and having one end thereof connected to the valve and its other end connected to the diaphragm so that it operates to open the valve when the diaphragm fluctuates in one direction as the result of a decrease in pressure within the casing, means for causing the gas after striking against the seat engaging face of the valve to flow in a thin tubular stream around the side face of the valve and then to pass by said one end of the lever and directly into the outlet in such manner as to create adjacent to the inner end of the outlet a jet action which increases in magnitude as the rate of flow of gas into the outlet increases and effects a corresponding diminution or decrease of pressure of the gas in the chamber, and means for guiding the portion of the tubular stream that would normally impinge against the valve carrying end of the lever and flow towards the diaphragm away from said valve carrying end of the lever prior to impingement thereagainst and thence into the outlet.

2. In a pressure regulator comprising a casing having in one portion thereof a diaphragm adapted to fluctuate in response to changes in pressure within the casing, and having in another portion thereof an inlet for gas under pressure and a gas outlet directly opposite to the inlet, the combination of means forming a valve seat around the inner end of the inlet, a valve for controlling the flow of gas into the casing, disposed between the inlet and outlet and in spaced relation with respect to the interior surfaces of the casing and having a seat engaging face disposed directly opposite to the valve seat and adapted to have the gas strike thereagainst and also having a substantially continuous side face centrally positioned with respect to, and of less width than, the gas outlet, a lever for moving the valve in response to fluctuation of the diaphragm to and from the valve seat in order to regulate or control the pressure of the gas flowing out of the casing via the outlet, centrally fulcrumed in the casing and having one end thereof connected to the valve and its other end connected to the diaphragm so that it operates to open the valve when the diaphragm fluctuates in one direction as the result of a decrease in pressure within the casing, means for causing the gas after striking against the seat engaging face of the valve to flow in a thin tubular stream around the side face of the valve and then to pass by said one end of the lever and directly into the outlet in such manner as to create adjacent to the inner end of the outlet a jet action which increases in magnitude as the rate of flow of gas into the outlet increases and effects a corresponding diminution or decrease of pressure of the gas in the chamber, and means formed integrally with the body of the valve for guiding the portion of the tubular stream that would normally impinge against the valve carrying end of the lever and flow towards the diaphragm away from said valve carrying end of the lever prior to impingement thereagainst and thence into the outlet.

3. In a pressure regulator comprising a casing having in one portion thereof a diaphragm adapted to fluctuate in response to changes in pressure within the casing, and having in another portion thereof an inlet for gas under pressure and a gas outlet directly opposite to the inlet, the combination of means forming a valve seat around the inner end of the inlet, a valve for controlling the flow of gas into the casing, disposed between the inlet and outlet and in spaced relation with respect to the interior surfaces of the casing and having a seat engaging face disposed directly opposite to the valve seat and adapted to have the gas strike thereagainst and also having a substantially continuous side face centrally positioned with respect to, and of less width than, the gas outlet, a lever for moving the valve in response to fluctuation of the diaphragm to and from the valve seat in order to regulate or control the pressure of the gas flowing out of the casing via the outlet, centrally fulcrumed in the casing and having one end thereof connected to the valve and its other end connected to the diaphragm so that it operates to open the valve when the diaphragm fluctuates in one direction as the result of a decrease in pressure within the casing, means for causing the gas after striking against the seat engaging face of the valve to flow in a thin tubular stream around the side face of the valve and then to pass by said one end of the lever and directly into the outlet in such manner as to create adjacent to the inner end of the outlet a jet action which increases in magnitude as the rate of flow of gas into the outlet increases and effects a corresponding diminution or decrease of pressure of the gas in the chamber, means forming a duct leading from the valve carrying end of the lever to the outlet, and means for guiding the portion of the tubular stream that would normally impinge against the valve carrying end of the lever and flow towards the diaphragm away from said valve carrying end of the lever prior to impingement thereagainst and thence into the duct for passage to the outlet.

4. In a pressure regulator comprising a casing having in one portion thereof a diaphragm adapted to fluctuate in response to changes in pressure within the casing, and having in another portion thereof an inlet for gas under pressure and a gas outlet directly opposite to the inlet, the combination of means forming a valve seat around the inner end of the inlet, an elongated valve for controlling the flow of gas into the casing, extending longitudinally between the inlet and outlet and in spaced relation with respect to the interior surfaces of the casing and having in one end thereof a longitudinally extending duct with one end thereof opening towards the outlet, and a seat engaging face at its other end disposed directly opposite to the valve seat and adapted to have the gas strike thereagainst and also having a substantially continuous side face centrally positioned with respect to, and of less width than, the gas outlet, a lever for moving the valve in response to fluctuation of the diaphragm to and from the valve seat in order to regulate or control the pressure of the gas flowing out of the casing via the outlet, centrally fulcrumed in the casing and having one end thereof connected to said one end of the valve and its other end connected to the diaphragm so that it operates to open the valve when the diaphragm fluctuates in one direction as the result of a decrease of pressure within the casing, means for causing the gas after striking against the seat engaging face of the valve to flow in a thin tubular stream around the side face of the valve and then to pass by said one end of the lever and directly into the outlet in such manner as to create adjacent to the inner end of the outlet a jet action which increases in magnitude as the rate of flow of gas into the outlet increases and effects a corresponding diminution or decrease of pressure of the gas in the chamber, and means for guiding the portion of the tubular stream that is directed towards the valve carrying end of the lever into the other end of the duct for passage through said duct to the outlet.

5. In a pressure regulator comprising a casing having in one portion thereof a diaphragm adapted to fluctuate in response to changes in pressure within the casing, and having in another portion thereof an inlet for gas under pressure and a gas outlet directly opposite to the inlet, the combination of means forming a valve seat around the inner end of the inlet, an elongated valve for controlling the flow of gas into the casing, extending longitudinally between the inlet and the outlet and in spaced relation with respect to the interior faces of said another portion of the casing and having in one end thereof a cross-slot and a longitudinal groove-formed duct at one side of the slot with one end thereof opening towards the outlet, and a seat engaging face at its other end disposed opposite to the valve seat and adapted to have the gas strike thereagainst, and also having a substantially continuous side face centrally positioned with respect to, and of less width than, the outlet, a lever for moving the valve in response to fluctuation of the diaphragm to and from the valve seat in order to regulate or control the pressure of the gas flowing out of the casing via the outlet, centrally fulcrumed in the casing and having one end thereof extending into the cross slot and movably connected to the valve and its other end connected to the diaphragm so that it operates to open the valve when the diaphragm fluctuates in one direction as the result of a decrease of pressure within the casing, means for causing the gas after striking against the seat engaging face of the valve to flow in a thin tubular stream around the side face of the valve and then to pass by said one end of the lever and directly into the outlet in such manner as to create adjacent to the inner end of the outlet a jet action which increases in magnitude as the rate of flow of gas into the outlet increases and effects a corresponding diminution or decrease of pressure of the gas in the chamber, and means for guiding the portion of the tubular stream that is directed towards said one end of the lever into the cross slot and thence to the other end of the duct for passage through the duct to the outlet.

6. In a pressure regulator comprising a casing having in one portion thereof a diaphragm adapted to fluctuate in response to changes in pressure within the casing, and having in another portion thereof an inlet for gas under pressure and a gas outlet directly opposite to the inlet, the combinations of means forming a valve seat around the inner end of the inlet, an elongated valve for controlling the flow of gas into the casing, extending longitudinally between the inlet and the outlet and in spaced relation with respect to the interior faces of said another portion of the casing and having in one end thereof a cross-slot and a longitudinal groove-formed duct at one side of the slot with one end thereof opening towards the outlet, and a seat engaging face at its other end disposed opposite to the valve seat and adapted to have the gas strike thereagainst, and also having a substantially continuous side face centrally positioned with respect to, and of less width than, the outlet, a lever for moving the valve in response to fluctuation of the diaphragm to and from the valve seat in order to regulate or control the pressure of the gas flowing out of the casing via the outlet, centrally fulcrumed in the casing and having one end thereof extending into the cross slot and movably connected to the valve and its other end connected to the diaphragm so that it operates to open the valve when the diaphragm fluctuates in one direction as the result of a decrease of pressure within the casing, means for causing the gas after striking against the seat engaging face of the valve to flow in a thin tubular stream around the side face of the valve and then to pass by said one end of the lever and directly into the outlet in such manner as to create adjacent to the inner end of the outlet a jet action which increases in magnitude as the rate of flow of gas into the outlet increases and effects a corresponding diminution or decrease of pressure of the gas in the chamber, and means consisting of a curved surface at one end of the cross-slot adapted to entrain the portion of the tubular stream that is directed towards said one end of the lever and direct it through the cross-slot into the other end of the duct and for passage through said duct to the outlet.

7. In a pressure regulator comprising a casing having a diaphragm in one portion thereof and having in another of its portions an inlet for gas under pressure and a gas outlet opposite to the inlet, the combination of a valve for controlling the flow of gas through the casing disposed between the inlet and the outlet, a lever for actuating the valve in response to fluctuation of the diaphragm, centrally fulcrumed in the casing and having one end thereof connected operatively to the diaphragm and its other end connected to the valve, means for causing the gas entering the casing via the inlet to flow in a thin tubular stream around the valve and past said other end of the valve into the outlet, and means in the form of a curved or rounded surface on said other end of the lever for causing any portion of the tubular stream that impinges against said other end of the lever to flow back into the stream into the outlet.

GARNET W. McKEE.